United States Patent [19]

Lorsson

[11] 4,420,910
[45] Dec. 20, 1983

[54] CONTROL DEVICE FOR A GRINDING MACHINE

[76] Inventor: Sture Larsson, Lidköping, Sweden

[73] Assignee: Lidkopings Mekaniska Verkstads AB, Lidkoping, Sweden

[21] Appl. No.: 260,376

[22] Filed: May 4, 1981

Related U.S. Application Data

[63] Continuation of Ser. No. 88,420, Oct. 26, 1979, abandoned, which is a continuation of Ser. No. 930,758, Aug. 23, 1978, abandoned.

[30] Foreign Application Priority Data

Aug. 5, 1977 [SE] Sweden .............................. 7708912

[51] Int. Cl.³ ............................................. B24B 49/04
[52] U.S. Cl. .................................................. 51/165.88
[58] Field of Search ........... 51/165 R, 165.87, 165.88, 51/165.93, 165.77; 125/11 R

[56] References Cited

U.S. PATENT DOCUMENTS

| | | | |
|---|---|---|---|
| 3,003,293 | 10/1961 | Gluckowicz | 51/165.88 |
| 3,798,845 | 3/1974 | Stevens | 51/165.87 |
| 4,015,372 | 4/1977 | Fukuma | 51/165.88 |
| 4,059,927 | 11/1977 | Robillard | 51/165.87 |
| 4,123,878 | 11/1978 | Lizotte | 51/165.87 |
| 4,139,969 | 2/1974 | Brown | 51/165.77 |

*Primary Examiner*—Harold D. Whitehead
*Attorney, Agent, or Firm*—Eugene E. Renz, Jr.

[57] ABSTRACT

A device for controlling the feeding of a grinding wheel (2, 16) relative to a truing device (8, 19) for the grinding wheel at truing operations in a grinding machine incorporating a measuring apparatus (9, 9a) for indicating the finished size of the ground surface of the workpiece (5, 12), means for controlling the feeding using the indications obtained, means for setting the operation cycle of the machine thus that truing of the grinding wheel is effected after a predetermined number of grinding operations by means of a truing device, which is mounted in a fixed position on the workhead and arranged in such a manner as to follow the movements of the workpiece during the grinding procedure, first members (24, 31) for establishing the position of the grinding wheel spindle relative to the workpiece and the truing device and second members for controlling the relative movement between the workpiece truing device and the grinding wheel during the truing a pre-determined distance characterized by that it incorporates a memory (33) containing a value representing the position of the truing device relative to the grinding wheel at the end of the preceding truing operation, which position establishes the initial position of the truing device at the immediate truing operation, a position register (32) for determining the position of the grinding wheel when finished measure is indicated in the measuring apparatus in the first grinding cycle after the preceding truing operation, and a comparator (30) for comparing the actual position of the grinding wheel in relation to the workpiece when the measuring apparatus indicates correct measure, the contents of the memory being adjusted by any difference possible established by the comparator.

4 Claims, 5 Drawing Figures

CONTROL DEVICE FOR A GRINDING MACHINE

BACKGROUND OF THE INVENTION

This application is a continuation of my prior application Ser. No. 088,420 filed on Oct. 26, 1979 now abandoned which is a continuation of Ser. No. 930,758 filed on Aug. 23, 1978 for A CONTROL DEVICE FOR A GRINDING MACHINE which is now abandoned.

The present invention refers to a device for controlling the feeding of a grinding wheel relative to a truing device for the grinding wheel during truing operations.

In automatic grinding machines, wherein the workpieces shall be ground to high dimensional accuracy, e.g., in grinding roller bearing rings, the wear of the grinding wheel and the dimensional change during repeated grinding and truing operations will cause a problem since the position of the work-piece will be altered in relation to the grinding wheel spindle when the work piece will get correct measures as the size of the grinding wheel is altered. This problem is accentuated thereby that also the truing device after some time wears with resulting changes of the truing position. The diameter of the grinding wheel is usually reduced some ten $\mu$m at each truing operation and each grinding wheel is dressed several times before it is replaced. It is furthermore usual that the tip of the truing device can wears in the order of hundreds of $\mu$m before the tip of the truing device is replaced. Thermal dimensional changes of the grinding machine parts can also influence the grinding process. In view of the fact that the size tolerances for the ground surfaces of the workpiece can be some single $\mu$m it is understood that correction of the feeding parameters for wear and other changes of the machine part dimensions must be effected continuously during the grinding process and at least between each dressing or truing operation.

It is earlier known to measure the ground surface of the workpiece during the grinding process and to control the grinding operation feeding on the basis of an indication of the grinding spindle position in relation to the workpiece, when the measurement shows a desired workpiece size. If the truing device is fixed in relation to the workpiece, such that it follows the workpiece movements during the active grinding process, i.e., when the material removal takes place, the feed slide of the grinding wheel is adjusted or the feed slide of the workpiece is adjusted a distance corresponding to the calculated dimensional change of the grinding wheel at the time of truing as a compensation for said dimensional change.

A condition for this calculation of the grinding wheel dimensional change is however that the tip of the truing device, which generally consists of a diamond, is quite fixed in relation to the workpiece. As earlier mentioned the diamond tip wears, whereby its position in relation to the workpiece is gradually changed. This is first noticed as a change of the relative positions of the grinding spindle and the workpiece when the finished size is reached during the grinding. In order to compensate for this truing device wear it is known to arrange the truing device adjustable on the feed slide of the workpiece, so that it can be moved forward a distance corresponding to the wear.

The known grinding machines are thus provided with particular mechanical attachments for feeding the truing device in order to change the truing position on the feed slide. These attachments of course mean complications from constructional and functional aspects and the purpose of the present invention is to provide a grinding machine, wherein such attachments can be eliminated although corrections for dimensional changes of different machine parts during operation still can be made. In accordance with the present invention, the dresser tool is mounted in a fixed position on the workpiece slide and an electronic control system is provided which effectively measures and compensates for dresser wear during various cycles of the grinding process.

With such a device equally thick layers of the grinding wheel are always removed during the truing operations independent of the corrections made and an optic indication of the movement of the machine during operation can easily be brought about thus that the truing and grinding processes can be easily controlled and manual adjustments can be made when needed. Very small size tolerances can be obtained on the ground workpieces and the working speed is high.

DESCRIPTION OF THE DRAWINGS

The invention will in the following be further described with reference to the accompanying drawing, in which.

DESCRIPTION OF THE PREFERRED EMBODIMENTS

Figure 1:
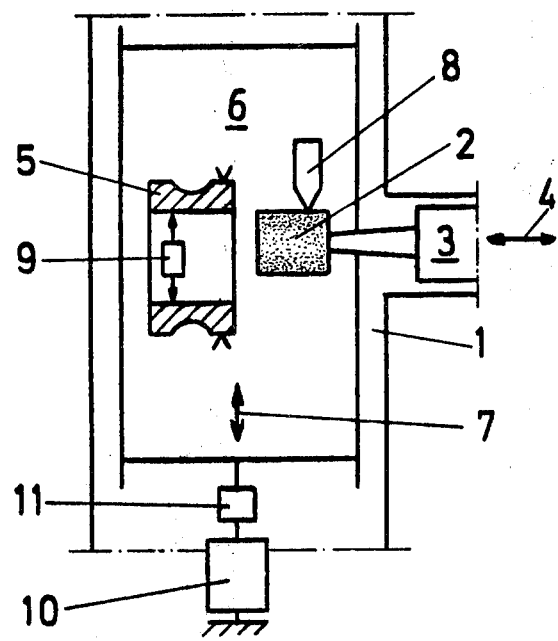
FIG. 1 is a schematic view of the details of an internal grinding machine, which preferably can be provided with a device according to the invention.

The grinding machine schematically shown in FIG. 1 incorporates a frame 1 and a grinding wheel 2 mounted of the frame driven by a motor 3. The grinding wheel is axially displaceable in a direction shown with the double arrow 4, so that it can be moved toward and away from a workpiece 5, which is here shown in the form of an inner ring of a ball bearing, the bore of which is to be ground. The workpiece is fixedly located and in a manner known per se rotatable on a slide 6, which is displaceable on the frame 1 in one direction mainly perpendicular to the axis of the grinding wheel such as shown by the double arrow 7. A truing device 8 for the grinding wheel is also fixed on the slide 6, which truing device is provided with a diamond tip or the like for engagement with the surface of the grinding wheel during the truing operation. The ground surface of the workpiece is measured during the grinding process by means of a measuring apparatus 9 designed in such a way that its sensing means can be inserted into the bore of the ring 5. The displacement of the slide 6 and thereby also of the workpiece 5 and the truing device 8 in the directions of the arrow 7 relative to the grinding wheel 2 can be effected by arrangements which are known per se, such as a step motor 10 and if desired a particular feed and resetting device 11, which will entail fast positional changes of the slide 6 at the beginning and the end of the machine operation cycle when the workpiece is exchanged. The device for displacement of the grinding wheel 2 in the directions shown by arrow 4 is also known per se and it is therefore not shown. Means for detection of the position of the slide 6 on the frame 1 and thereby also the position of the grinding wheel relative to the workpiece and the truing device can be arranged to cooperate with the feeding system of the machine together with the measuring apparatus 9. In the case where the displacement of the slide 6 is brought about by means of a step motor 10, this detection can be omitted and can be substituted by the step motor control. The positions can be visualized for instance by means of digit tubes, which can be influenced by the control means of the step motor.

If it is supposed that the truing of the grinding wheel takes place after each grinding operation, then the work cycle of the machine is for instance the following for a precision grinding operation: The slide 6 will return to its initial position after truing, whereupon the wheel 2 is fed into the bore of the workpiece 5 and the slide 6 is moved forward by the feed device 11 a specific distance, whereby the space between the surfaces of the grinding wheel and the workpiece in practice will be reduced momentarily. The motor 10 will thereupon take over the feeding of the slide 6, which feeding will be fast until the surfaces of the grinding wheel and the workpiece engage each other. A device known per se establishes when the engagement takes place and it will then influence the motor 10 such that the feeding thereupon has a speed adapted for the initial material-removing grinding stage, the so called rough grinding stage. When the measuring apparatus 9 indicates a predetermined measurement on the surface of the workpiece machined, the motor 10 is again actuated to reduce the feeding speed whereupon a so called fine grinding stage follows.

After a further measurement indication and a control pulse to the motor 10, a so called finish grinding stage follows with a slow feeding until the measuring apparatus senses the desired finish size, whereby the feed is interrupted and the slide 6 is returned momentarily by means of the device 11 a distance corresponding to the infeed at the beginning of the work cycle. The grinding wheel 2 and the slide 6 with the truing device 8 are thereupon moved to the positions they took up during the preceding truing operation. A new truing operation is thereupon effected after a compensation feeding of the slide 6 a predetermined distance corresponding to the desired truing depth on the grinding wheel which compensation feed is effected by the motor 10. The workpiece can be replaced at the same time and the slide 6 returns to its initial position after the ended truing, whereupon a new work cycle can start. It may be convenient to return the slide 6 a distance between the rough and the fine grinding stages and between the fine and finish grinding stages in order to compensate for the elasticity of the machine and thereby momentarily to reach gradually lower grinding pressure in the different grinding stages.

The starting and the end positions for the feed of the slide 6 at the truing and also the initial position of the slide during beginning of each grinding process can be adjusted and they do not only depend on the dimensional change of the grinding wheel during truing but also on the wear of the truing device and possibly also on other dimensional changes of the machine during operation. The device according to the invention is for this purpose provided with means for establishing the starting and end positions for the feed of the slide 6 at the truing in the subsequent truing operation and also the start position in the subsequent grinding operation in relation to the position of the slide 6 when the desired size of the ground surface has been measured in apparatus 9 in the grinding cycle immediately after the preceding truing operation. For instance, if it is established by means of a particular detector or by means of the control means of the step motor that the slide 6 has been fed a shorter distance than calculated when the desired finish measure has been indicated in the apparatus 9 it can be supposed that the truing device has been worn off whereby the measure of the grinding wheel has been reduced less than calculated. The subsequent truing is then started at the position the slide had after the nearest preceding truing, but the starting position for the subsequent truing operation is after the compensation feed and the truing moved a distance so the slide 6 is moved somewhat backwards when the next grinding cycle starts. A further explanation of this is herebelow given with reference to FIG. 3.

Instead of using an apparatus 9 by means of which the ground surface can be continuously measured it is possible to use a device which only indicates when the desired finish size has been measured on the work piece e.g. a caliper. Instead of then controlling the feed of the slide in dependency of the measure result it is possible to effect the change between the rough and fine grinding stages and between the fine and finish grinding stages respectively at given time intervals or at given slide feed lengths. As the resiliency of the grinding spindle is considerable in relation to the material removal at the finish grinding stage, this stage can take place without any feeding of the slide. The control of the truing operation can thereby not be based on the position of the slide when the desired finish workpiece measure has been obtained but it is instead preferably based on how long a time duration the finish grinding stage requires before the desired measure has been obtained. The design of the control device is in principle the same either it is based on the measured slide feeding distance or the measured time used at the finish grinding stage. More specifically, the comparator 30, pulse counter and indicator 31 and register 32 include time counters designated 30a, 31a and 32a, respectively. When the system operates based on time measurements, register 32 then accumulates a calculated time for finished grinding without grinding wheel slide feed or so-called spark-out time and indicator 31 provides the actual spark-out time. Comparator 30 then compares these times and the content of memory 33 is adjusted depending on the comparison result whereby time measurements are, therefore, translated to pulses, i.e. steps.

Figure 2:
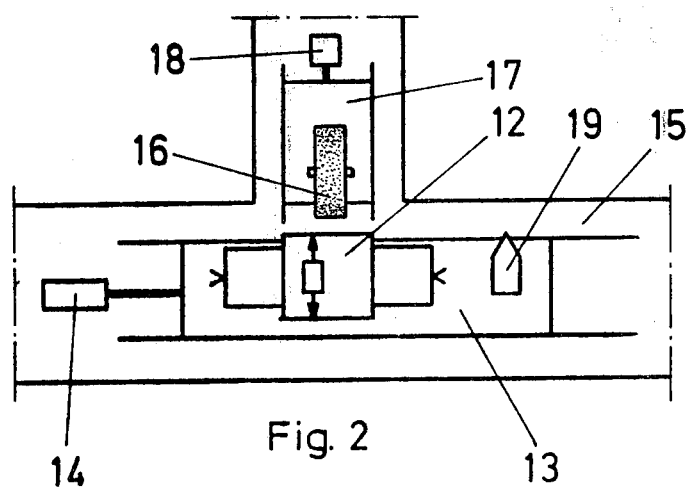
FIG. 2 is a schematic illustration of details of an external grinding machine, which could preferably be provided with a device according to the invention.

The invention is useful also in machines other than internal grinding machines. In FIG. 2 is shown in an explanatory sketch, details of a machine for grinding an external cylindrical surface of a workpiece 12. The workpiece is rotatably clamped but it is fixedly located on a slide 13, which is displaceable along a frame 15 parallel to the axis of the workpiece 12 by means of a feeding device 14. A grinding wheel 16 is rotatably arranged on another slide 17, which is displaceable against the work piece 12 by means of a feed device 18. A truing device 19 for the grinding wheel is fixed on the slide 13. In this machine the feeding of the slide 17 with the grinding wheel 16 is effected against the workpiece 12 and the truing device 19 in contrast to the machine according to FIG. 1, where the slide 6 with the workpiece and truing device is fed against the grinding wheel 2, but the control of the feeding is effected in a corresponding manner as that described in connection to FIG. 1 and as described herebelow in relation to FIG. 3 with obvious modifications. A control device according to the invention can be used when grinding axial as well as radial surfaces, whereby in the latter case the compensation takes place in a direction which is mainly parallel to the rotational surface of the workpiece.

Figure 3:
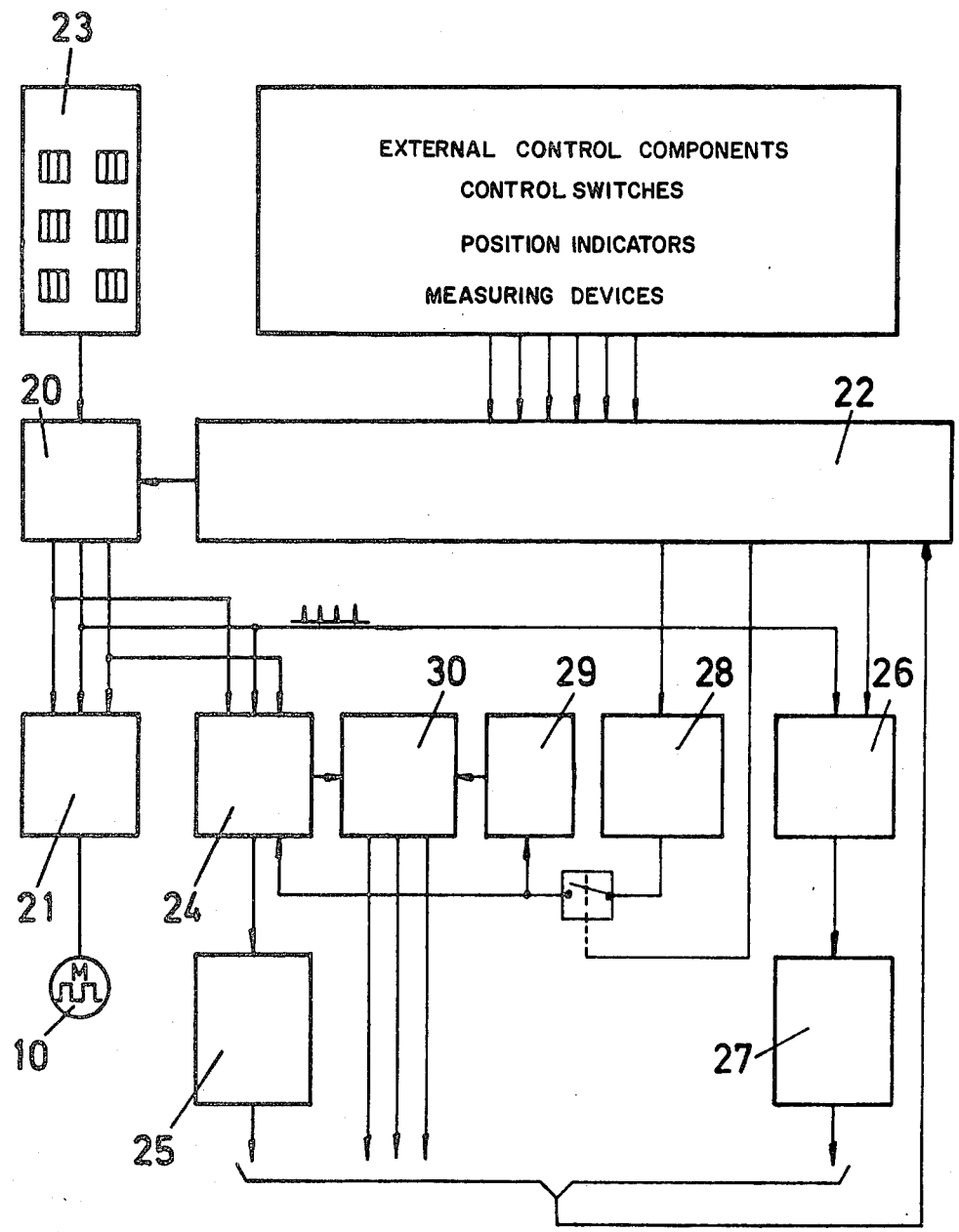
FIGS. 3 and 4 are diagrams showing the principles for two embodiments of a device according to the invention, which can be used e.g. at a machine according to FIG. 1 or 2.

In FIG. 3 is shown the principle for an embodiment of a device according to the invention for control of the feed according to the above. The device for feeding the grinding wheel in the direction of the arrow 4 in FIG. 1 is conventional and it is therefore not shown. The motor 10 is supposed to be a conventional step motor, which is actuated by a pulse generator 20 via an amplifier 21. The pulse generator is controlled by a sequence logic unit 22, which receives pulses from e.g. initiators, operation switches, measuring apparatus (9 according to FIG. 1). selectors for truing interval and programme switches. The pulse frequency and thereby the feeding speed for the slide (6 in FIG. 1) at the different grinding stages can be chosen and be pre-set in a switch 23. A pulse counter and indicator 24 for the position of the slide 6 is actuated by the pulse generator 20. Positions which are calculated by the counter 24 and are desired to be indicated at different stages of the grinding operation are set in a switch unit 25. A counter 26 controls the feed at the compensations and the compensation feed which takes place e.g. at each truing operation can be chosen and pre-set by means of a switch 27.

A position index 28 stores the position to be indicated by the pulse counter 24 at the truing operation. The position is transferred after ended truing to the pulse counter 24 and also to a memory 29, which effects that the subsequent truing operation will be started from the same position on the slide, which this had after the nearest preceding truing. The position index 28 can during grinding change its position contents in response to any earlier specified slide position deviation from the calculated and desired position at finish size and also at deviations from the desired finish grinding time for obtaining of the desired finish size resp. A comparator 30, which compares the positions in the counter 24, which represent the actual position of the slide 6 and the position in the memory 29 establishes when the counter 24 and thereby the slide 6 has reached the position of the memory 29, i.e. to the starting position for the truing. If in a grinding cycle following a truing operation the counter 24 for instance indicates the desired position, when the desired finish size has been obtained on the workpiece—which can be established by comparison with the indicator in the counter 24 and the desired position for the obtained finish size as pre-set in the switching unit 25 in the case the feeding of the slide has been used for controlling the control device—the position earlier fed into the position index 28 will be retained until the subsequent truing, which starts at a position in the counter 24 corresponding to the position of the memory 29. When this position in the counter 24 has been reached the compensation feed which has been set on the switch 27 and which corresponds the desired truing depth is effected whereupon the truing operation takes place. The vizualised position of the counter 24 is thereby reset such that it at the end of the truing shows the same position as that shown before the compensation feed took place, i.e. the same position as in the buffer store 29 and in the position index 28.

If in a grinding cycle after a truing operation the counter 24 instead indicates a position which deviates from the position set in the switching unit 25, when the desired finish size has been obtained on the workpiece, the position of the index 28 is changed in such a manner that the indicated deviation is corrected. The subsequent truing operation is as earlier started at the position of the counter 24 corresponding to the position of the memory 29 and the compensation feed and the truing takes place as earlier described. The new position in the index 28 is thereby fed into the memory 29 and the pulse counter 24 whereby the subsequent truing will start when the counter 24 shows this new position.

Figure 4:
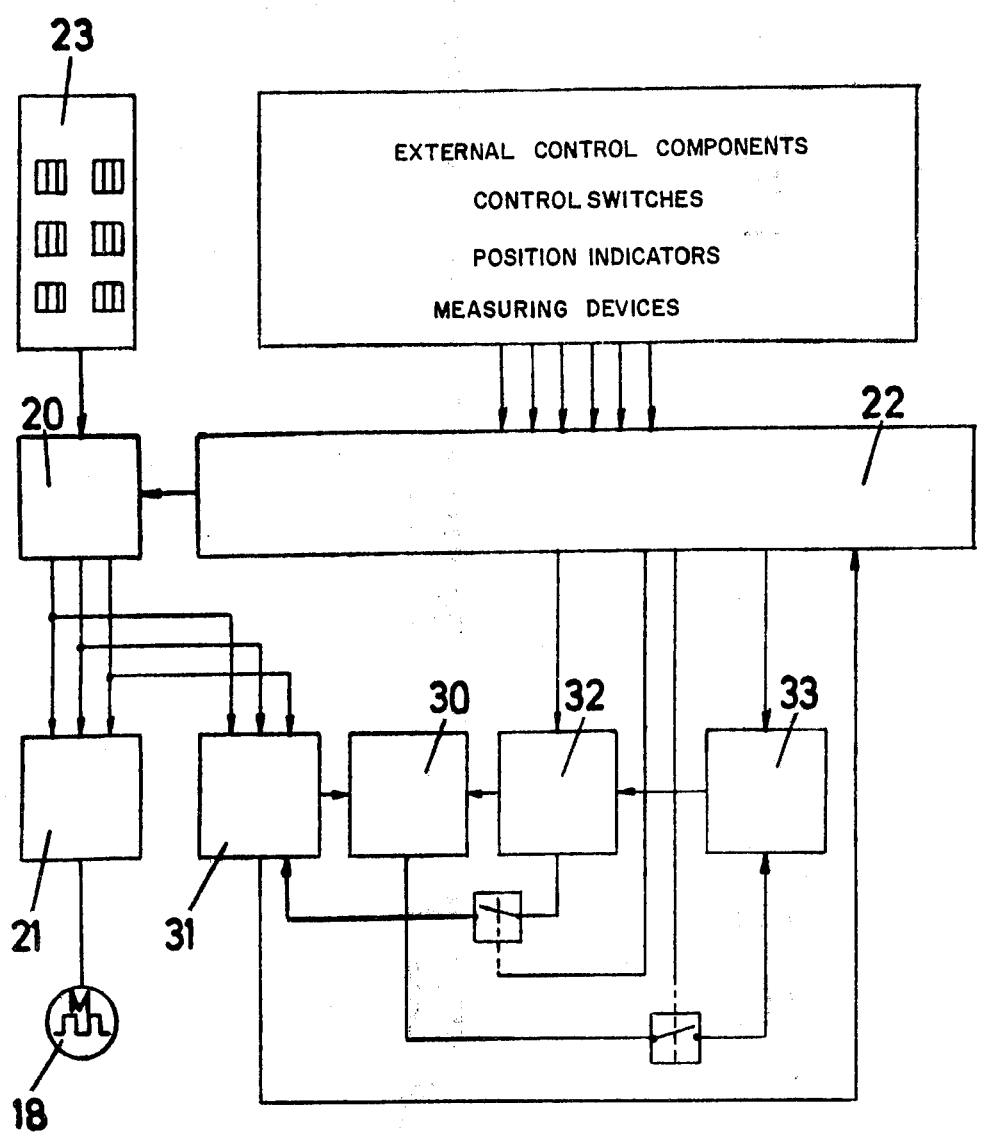
Figure 5:
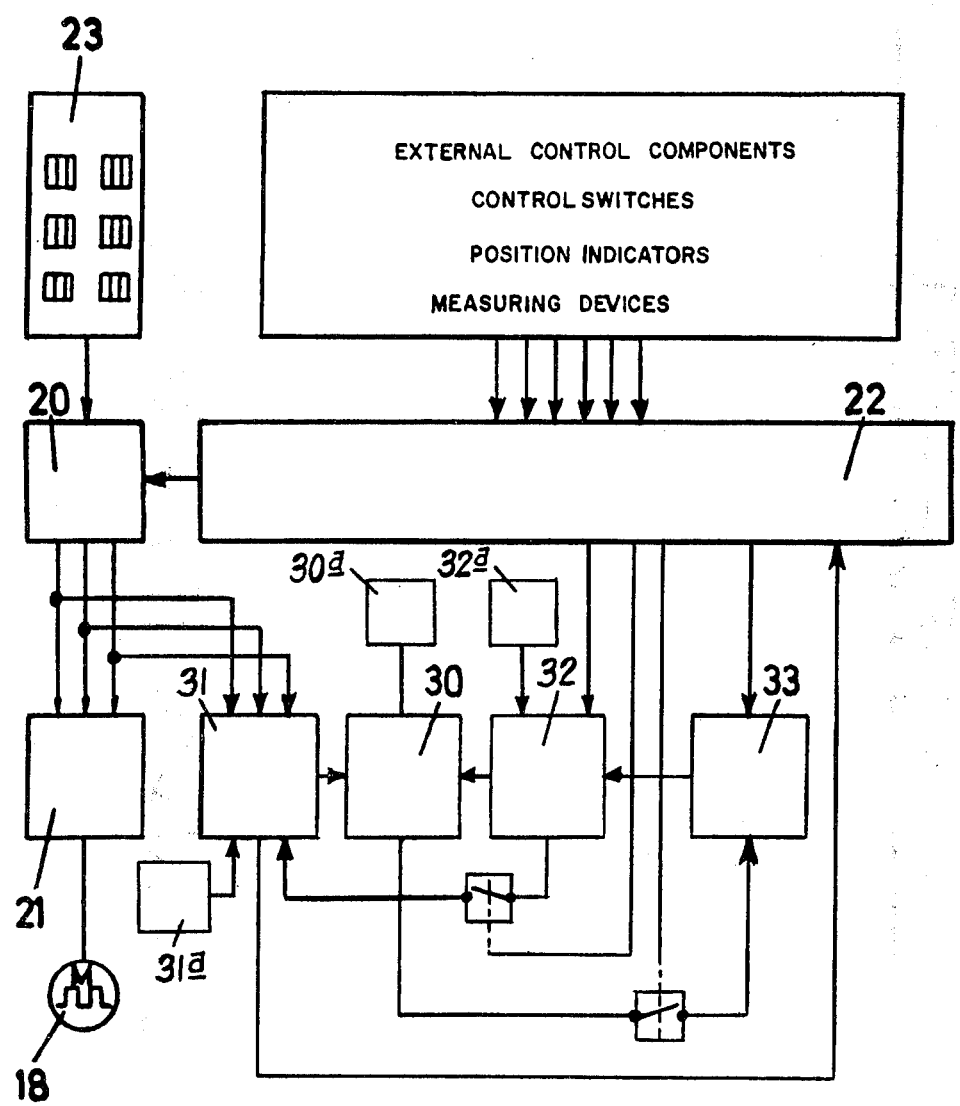
FIG. 5 is a schematic of another embodiment in accordance with the present invention wherein the system is controlled by various time interval measurements.

FIG. 4 shows the principle of an alternative embodiment of a device according to the invention, which will be described as connected to such a machine as the one shown in FIG. 2. The motor 18 in FIG. 2 is preferably a conventional step motor which is actuated by a pulse generator 20 via an amplifier 21. The motor is controlled by a logic sequence unit 22, which receives pulses from e.g. initiators, operation switches, measuring devices (9a according to FIG. 2), selectors for truing intervals and programme switches. The pulse frequency and thereby the feeding speed of the slide (17 in FIG. 2) at the different grinding stages can be selected and pre-set in a switch 23. A pulse counter and indicator 31 for the position of the slide 17 is actuated by the pulse generator 20.

A position register 32 accumulates the position which the position indicator 31 should indicate when the desired measure of the workpiece is obtained according to the desired measured position on the first grinding cycle after the previous truing operation. When the measuring device 9a indicates correct measure, the position indicated in the register 32 is transferred to the indicator 31 (these are equalized, which means that the indicator 31 is calibrated). Thereby it is compensated for possible wear of the grinding wheel or other changes in the machine. A memory 33 contains a value representing the position of the diamond at the end of the previous truing operation. Before truing this value is fed into the register 32 and the slide 17 is moved so that indicator 31 shows the same value as the register 32. Thereafter the slide 17 is moved forward corresponding to the truing depth without changing the contents of the registers. A comparator 30 compares and calculates the difference between the content of register 32 with the position of slide 17 according to indicator 31 before they are equalized and the content of the memory 33 is adjusted by the value of comparator 30 when the work piece is finished. Thereby the real position of the truing diamond is contained in memory 33 is adjusted.

What is claimed is:

1. A device for controlling the feeding of a grinding wheel (2, 16) relative to a truing device (8, 19) for the grinding wheel at truing operations in a grinding machine incorporating a measuring apparatus (9) for indicating finished size of the ground surface of the workpiece (5, 12), means for controlling the feeding using the indications obtained, means for setting the operation cycle of the machine thus that truing of the grinding wheel is effected after a predetermined number of grinding operations by means of a truing device, which is mounted in a fixed position on the workhead and arranged in such a manner as to follow the movements of the workpiece during the grinding procedure, first members (24) for establishing the position of the grinding wheel spindle relative to the workpiece and the truing device and second members (26, 27) for controlling the feeding movement of the workpiece and of the truing device relative to the grinding wheel during the truing a specific distance, characterized thereby, that it incorporates a comparator (30), to which is connected said first member (24) and a memory (29) for establishing the initial position for the truing at each truing operation and a position index (28) for establishing the position of the grinding wheel spindle relative to the truing device after each truing operation in dependency of a settled position indication or a settled grinding time, when the desired finish size on the ground surface is indicated in the measuring apparatus (9) in a grinding cycle after the preceding truing operation, whereby the position of the position index (28) is fed into said first member (24) and into the memory (29) at each truing operation.

2. A device for controlling the feeding of a grinding wheel (2, 16) relative to a truing device (8, 19) for the grinding wheel at truing operations in a grinding machine incorporating a measuring apparatus (9, 9a) for indicating the finished size of the ground surface of the workpiece (5, 12), means for controlling the feeding using the indications obtained, means for setting the operation cycle of the machine thus that truing of the grinding wheel is effected after a predetermined number of grinding operations by means of a truing device, which is mounted in a fixed position on the workhead and arranged in such a manner as to follow the movements of the workpiece during the grinding procedure, first members (24, 31) for establishing the position of the grinding wheel spindle relative to the workpiece and the truing device and second members for controlling the relative movement between the workpiece/truing device and the grinding wheel during the truing a predetermined distance characterized thereby it incorporates a memory (33) containing a value representing the position of the truing device relative to the grinding wheel at the end of the preceding truing operation, which position establishes the initial position of the truing device at the immediate truing operation, a position register (32) for determining the position of the grinding wheel when finished measure is indicated in the measuring apparatus in the first grinding cycle after the preceding truing operation, and a comparator (3) for comparing the actual position of the grinding wheel in relation to the workpiece when the measuring apparatus indicates correct measure, the contents of the memory being adjusted by any possible difference established by the comparator.

3. A system in a grinding apparatus comprising a grinding wheel and means for actuating it in a predetermined direction, a workhead slide for mounting a workpiece and movable in a second predetermined direction, a truing device mounted in a fixed position on the workhead slide, means for setting the operation cycle of the apparatus including means for determining the calculated position of the grinding wheel relative to the workpiece for a predetermined cycle of a plurality of cycles in the grinding operation, a measuring means for determining the size of the workpiece after a predetermined cycle, means for truing the grinding wheel during the grinding operation, means for comparing the actual position of the grinding wheel and workhead during a given cycle of the grinding operation, as determined by said measuring means, and the calculated position and means for adjusting the relative position of the grinding wheel and workhead in the next succeeding cycle of the grinding operation thereby to compensate for wear of the truing device and other variables such as deflection and wear of the grinding wheel.

4. A system in a grinding apparatus comprising a grinding wheel and means for actuating it in a predetermined direction, a workhead slide for mounting a workpiece and movable in a second predetermined direction, a truing device mounted in a fixed position on the workhead slide, means for setting the operation cycle of the apparatus including means for determining the calculated position of the grinding wheel relative to the calculated grinding time for a predetermined cycle of a plurality of cycles in the grinding operation, a measuring means for determining the size of the workpiece after a predetermined cycle, means for truing the grinding wheel during the grinding operation, means for comparing the actual position of the grinding wheel and the actual grinding time during a given cycle of the grinding operation as determined by said measuring means and the calculated grinding time and means for adjusting the relative position of the grinding wheel and workhead in the next succeeding cycle of the grinding operation thereby to compensate for wear of the truing device and other variables such as deflection and wear of the grinding wheel.

* * * * *